(12) United States Patent
Martinez et al.

(10) Patent No.: US 8,359,066 B2
(45) Date of Patent: *Jan. 22, 2013

(54) MULTIMODE LAND MOBILE RADIO

(75) Inventors: Dennis Michael Martinez, Westford, MA (US); John Vaughan, Pepperell, MA (US)

(73) Assignee: Pine Valley Investments, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/424,956

(22) Filed: Mar. 20, 2012

(65) Prior Publication Data

US 2012/0178442 A1 Jul. 12, 2012

Related U.S. Application Data

(63) Continuation of application No. 11/167,005, filed on Jun. 24, 2005, now Pat. No. 8,145,262, which is a continuation-in-part of application No. 11/130,975, filed on May 17, 2005.

(51) Int. Cl.
*H04M 1/00* (2006.01)

(52) U.S. Cl. ............... 455/552.1; 370/328; 370/352; 455/550.1; 455/553.1

(58) Field of Classification Search ............... 455/552.1
See application file for complete search history.

(56) References Cited

U.S. PATENT DOCUMENTS

| | | |
|---|---|---|
| 4,845,504 A | 7/1989 | Roberts et al. |
| 4,852,086 A | 7/1989 | Eastmond et al. |
| 4,955,083 A | 9/1990 | Phillips et al. |
| 5,265,264 A | 11/1993 | Dzung et al. |
| 5,479,480 A | 12/1995 | Scott |
| 5,790,527 A | 8/1998 | Janky et al. |
| 5,805,645 A | 9/1998 | Przelomiec et al. |
| 5,862,486 A | 1/1999 | Przelomiec |
| 5,870,149 A | 2/1999 | Comroe et al. |
| 5,915,212 A | 6/1999 | Przelomiec et al. |
| 5,930,723 A | 7/1999 | Heiskari et al. |
| 5,995,515 A | 11/1999 | Suzuki |
| 6,002,941 A | 12/1999 | Ablay et al. |
| 6,009,553 A | 12/1999 | Martinez et al. |
| 6,023,626 A | 2/2000 | Kinnunen et al. |
| 6,035,196 A | 3/2000 | Hengeveld et al. |
| 6,041,048 A | 3/2000 | Erickson et al. |
| 6,084,919 A | 7/2000 | Kleider et al. |
| 6,144,647 A | 11/2000 | Lopez-Torres |
| 6,163,710 A | 12/2000 | Blaser et al. |

(Continued)

FOREIGN PATENT DOCUMENTS

| | | |
|---|---|---|
| EP | 0 848 565 A2 | 6/1998 |
| EP | 1612996 A1 | 1/2006 |

(Continued)

OTHER PUBLICATIONS

M/A COM, Inc., VIDA Network Solutions—The IP Network Approach to Your Critical Communications, [online], May 18, 2004, pp. 1-8, XP-002619659, [retrieved on Feb. 1, 2011]. Retrieved from the Internet: < URL:http://www.racom.net/Downloads/VIDA_Brochure.pdf>.

(Continued)

*Primary Examiner* — Charles Appiah
*Assistant Examiner* — Mazda Sabouri
(74) *Attorney, Agent, or Firm* — Fox Rothschild, LLP; Robert J. Sacco

(57) ABSTRACT

A multimode land mobile radio (LMR) and a method of communicating land mobile radio (LMR) content using an LMR device are provided. The LMR includes an LMR communication portion configured to provide communication with an LMR network and a cellular data network communication portion configured to provide communication with a cellular data network.

10 Claims, 11 Drawing Sheets

U.S. PATENT DOCUMENTS

| | | |
|---|---|---|
| 6,215,778 B1 | 4/2001 | Lomp et al. |
| 6,253,082 B1 | 6/2001 | Hengeveld |
| 6,301,263 B1 | 10/2001 | Maggenti |
| 6,351,653 B1 | 2/2002 | Alberth, Jr. et al. |
| 6,373,828 B1 | 4/2002 | Stewart et al. |
| 6,373,946 B1 | 4/2002 | Johnston |
| 6,449,491 B1 | 9/2002 | Dailey |
| 6,477,150 B1 | 11/2002 | Maggenti et al. |
| 6,515,997 B1 | 2/2003 | Feltner et al. |
| 6,549,587 B1 | 4/2003 | Li |
| 6,591,084 B1 | 7/2003 | Chuprun et al. |
| 6,611,536 B1 | 8/2003 | Ahmed |
| 6,757,266 B1 | 6/2004 | Hundscheidt |
| 6,775,337 B2 | 8/2004 | Janky et al. |
| 6,788,946 B2 | 9/2004 | Winchell et al. |
| 6,826,414 B1 | 11/2004 | Reynolds et al. |
| 6,831,903 B2 | 12/2004 | Kang |
| 6,865,372 B2 | 3/2005 | Mauney et al. |
| 6,912,387 B2 | 6/2005 | Haas et al. |
| 6,928,067 B1 | 8/2005 | Hameleers et al. |
| 6,928,294 B2 | 8/2005 | Maggenti et al. |
| 6,937,589 B2 | 8/2005 | Taketsugu |
| 7,031,286 B1 | 4/2006 | Hall et al. |
| 7,050,786 B2 | 5/2006 | Caci |
| 7,050,787 B2 | 5/2006 | Caci |
| 7,061,894 B2 | 6/2006 | Pang et al. |
| 7,065,058 B1 | 6/2006 | Korus |
| 7,079,857 B2 | 7/2006 | Maggenti et al. |
| 7,130,282 B2 | 10/2006 | Black |
| 7,149,552 B2 | 12/2006 | Lair |
| 7,218,630 B1 | 5/2007 | Rahman |
| 7,221,660 B1 | 5/2007 | Simonson et al. |
| 7,239,867 B2 | 7/2007 | Kotzin et al. |
| 7,245,927 B2 | 7/2007 | Hansen |
| 7,250,830 B2 | 7/2007 | Layne et al. |
| 7,305,240 B2 | 12/2007 | Chou et al. |
| 7,307,963 B2 | 12/2007 | Chow et al. |
| 7,333,829 B2 | 2/2008 | Malone et al. |
| 7,443,965 B2 | 10/2008 | Blossom et al. |
| 7,460,510 B2 | 12/2008 | Olivier et al. |
| 7,483,416 B2 | 1/2009 | Olivier et al. |
| 7,489,698 B2 | 2/2009 | Blossom et al. |
| 7,492,734 B2 | 2/2009 | Mathis et al. |
| 7,492,737 B1 | 2/2009 | Fong et al. |
| 7,864,725 B2 | 1/2011 | Li et al. |
| 2001/0046214 A1 | 11/2001 | Kang |
| 2002/0086665 A1 | 7/2002 | Maggenti et al. |
| 2002/0086701 A1 | 7/2002 | Salmi et al. |
| 2002/0093928 A1 | 7/2002 | LoGalbo et al. |
| 2002/0101859 A1 | 8/2002 | Maclean |
| 2002/0115475 A1 | 8/2002 | Abrol et al. |
| 2002/0151321 A1 | 10/2002 | Winchell et al. |
| 2002/0161841 A1 | 10/2002 | Kinnunen |
| 2002/0196781 A1 | 12/2002 | Salovuori |
| 2003/0012217 A1 | 1/2003 | Andersson et al. |
| 2003/0053434 A1 | 3/2003 | Chow et al. |
| 2003/0058827 A1 | 3/2003 | Chow et al. |
| 2003/0119498 A1 | 6/2003 | Haas et al. |
| 2003/0134638 A1 | 7/2003 | Sundar et al. |
| 2003/0148785 A1 | 8/2003 | Mangal et al. |
| 2003/0156578 A1 | 8/2003 | Bergenlid et al. |
| 2003/0169768 A1 | 9/2003 | Bienn et al. |
| 2003/0177245 A1 | 9/2003 | Hansen |
| 2003/0189950 A1 | 10/2003 | Spear et al. |
| 2003/0190932 A1 | 10/2003 | Pulkkinen et al. |
| 2003/0198198 A1 | 10/2003 | Echavarri et al. |
| 2004/0032843 A1 | 2/2004 | Schaefer et al. |
| 2004/0121729 A1 | 6/2004 | Herndon et al. |
| 2004/0121781 A1 | 6/2004 | Sammarco |
| 2004/0190468 A1 | 9/2004 | Saijonmaa |
| 2004/0196861 A1 | 10/2004 | Rinchiuso et al. |
| 2004/0202940 A1 | 10/2004 | Kramer et al. |
| 2004/0203938 A1 | 10/2004 | Kulkarni |
| 2005/0058136 A1 | 3/2005 | Lothberg et al. |
| 2005/0070280 A1 | 3/2005 | Jung et al. |
| 2005/0073964 A1 | 4/2005 | Schmidt et al. |
| 2005/0078627 A1 | 4/2005 | Yoon et al. |
| 2005/0135348 A1 | 6/2005 | Staack |
| 2005/0143056 A1 | 6/2005 | Iyer et al. |
| 2005/0157673 A1 | 7/2005 | Verma et al. |
| 2005/0159107 A1 | 7/2005 | Mauney et al. |
| 2005/0176473 A1 | 8/2005 | Melpignano |
| 2005/0180418 A1 | 8/2005 | Andersen et al. |
| 2005/0197101 A1 | 9/2005 | Gupta |
| 2005/0232241 A1 | 10/2005 | Wu et al. |
| 2005/0233776 A1 | 10/2005 | Allen et al. |
| 2005/0243785 A1 | 11/2005 | Sabat et al. |
| 2005/0243857 A1 | 11/2005 | Hofstaedter et al. |
| 2006/0002372 A1 | 1/2006 | Smith |
| 2006/0013191 A1 | 1/2006 | Kavanagh |
| 2006/0035669 A1 | 2/2006 | Chuprun et al. |
| 2006/0077924 A1 | 4/2006 | Rune |
| 2006/0084457 A1 | 4/2006 | Laha et al. |
| 2006/0089180 A1 | 4/2006 | Salmi |
| 2006/0092865 A1 | 5/2006 | Williams |
| 2006/0104293 A1 | 5/2006 | Kopp et al. |
| 2006/0114890 A1 | 6/2006 | Martin Boys |
| 2006/0126635 A1 | 6/2006 | Alberth et al. |
| 2006/0141939 A1 | 6/2006 | Nakada |
| 2006/0145781 A1 | 7/2006 | Layne et al. |
| 2006/0147008 A1 | 7/2006 | Blossom et al. |
| 2006/0171307 A1 | 8/2006 | Gopalakrishnan et al. |
| 2006/0193295 A1 | 8/2006 | White et al. |
| 2006/0205398 A1 | 9/2006 | Seckendorf et al. |
| 2006/0209828 A1 | 9/2006 | Ng et al. |
| 2006/0221968 A1 | 10/2006 | Razdan et al. |
| 2006/0234762 A1 | 10/2006 | Ozluturk |
| 2006/0245425 A1 | 11/2006 | Mathis et al. |
| 2006/0262800 A1 | 11/2006 | Martinez et al. |
| 2006/0280144 A1 | 12/2006 | Kangas |
| 2006/0281471 A1 | 12/2006 | Shaffer et al. |
| 2007/0037596 A1 | 2/2007 | Shaffer et al. |
| 2007/0049314 A1 | 3/2007 | Balachandran et al. |
| 2007/0072554 A1 | 3/2007 | Janky |
| 2007/0081637 A1 | 4/2007 | Beard et al. |
| 2007/0153789 A1 | 7/2007 | Barker et al. |
| 2007/0173222 A1 | 7/2007 | Hansen |
| 2007/0201432 A1 | 8/2007 | Sood et al. |
| 2007/0207731 A1 | 9/2007 | Hansen |
| 2007/0242670 A1 | 10/2007 | Simonson et al. |
| 2007/0291744 A1 | 12/2007 | Lundberg et al. |
| 2008/0031207 A1 | 2/2008 | Martinez et al. |
| 2008/0031275 A1 | 2/2008 | Janky et al. |
| 2008/0075055 A1 | 3/2008 | Chow et al. |
| 2008/0146221 A1 | 6/2008 | Noldus |
| 2008/0159128 A1 | 7/2008 | Shaffer et al. |
| 2008/0175263 A1 | 7/2008 | Chen et al. |
| 2008/0205321 A1 | 8/2008 | Martinez |
| 2008/0214232 A1 | 9/2008 | Ozluturk |
| 2008/0218427 A1 | 9/2008 | Dobosz et al. |
| 2008/0298293 A1 | 12/2008 | Hiben et al. |
| 2008/0299942 A1 | 12/2008 | Goulder et al. |
| 2008/0317066 A1 | 12/2008 | Trine et al. |
| 2009/0005100 A1 | 1/2009 | Copeland |
| 2009/0024845 A1 | 1/2009 | Benshetler et al. |
| 2009/0138563 A1 | 5/2009 | Zhu et al. |
| 2009/0215411 A1 | 8/2009 | Tucker et al. |

FOREIGN PATENT DOCUMENTS

| | | |
|---|---|---|
| GB | 2315193 | 1/1998 |
| WO | 95/23485 A1 | 8/1995 |
| WO | 98 57482 A1 | 12/1998 |
| WO | 01 52563 A2 | 7/2001 |
| WO | 2005/039112 | 4/2005 |

OTHER PUBLICATIONS

Extended European Search Report mailed Mar. 3, 2011, European Application No. 10015389.9-1249, in the name of Pine Valley Investments, Inc.

M/A COM Inc.: "P25IP—Expanding Digital Communications", May 18, 2004, pp. 1-4, XP002619660, Retrieved from the Internet: URL:http://www.racom.net/Downloads/P24_Brochure.pdf [retrieved on Feb. 1, 2011].

Information about Related Patents and Patent Applications, see section 6 of the accompanying Information Disclosure Statement Letter, which concerns Related Patents and Patent Applications.

European Search Report mailed Feb. 24, 2011, Application Serial No. 10015388.1.

Whitepaper, Mobitv, "ATSC-M/H: The Promise of Free to Air Mobile Simulcast" found at <<http://www.mobitv.com/technology/whitepapers/ATSC.PDF>> on Mar. 13, 2009.

Software-Enabled Wireless Interoperability Assessment Report—Voice-over-IP Technology, Dec. 2001, www.safecomprogram.lgov/NR/rdonlyres/63893E23_C4EE-4779-BB91-600847499056/0/voip_technolgy_assessment.pdf.

"The Authoritative Dictionary of IEEE Standard Terms", Standards Information Network IEEE Press, Seventh Edition, p. 378.

Ericsson: "Communication and Information Services for National Security and Public Safety", White Paper, [online] Apr. 2005, pp. 1-25, XP002397357.

MULTIMODE LAND MOBILE RADIO

CROSS REFERENCE TO RELATED APPLICATIONS

This application is a continuation of and claims priority to copending non-provisional U.S. patent application Ser. No. 11/167,005, filed on Jun. 24, 2005, which is a continuation-in-part of and claims priority to copending non-provisional U.S. patent application Ser. No. 11/130,975, filed on May 17, 2005, which are hereby incorporated by reference in their entireties.

BACKGROUND OF THE INVENTION

This invention relates generally to land mobile radios, and more particularly, to a land mobile radio providing communication of land mobile radio content using a land mobile radio network or a cellular data network.

Land mobile radios (LMRs) may be used to provide communication between different mobile units. Land mobile radio band communication, for example, public safety radio communication (e.g., police, fire department, etc.) is generally available within the VHF, UHF, 700 MHz and 800 MHz frequency bands. Part of each of these frequency bands is allocated by the Federal Communications Commission (FCC) for public safety communication services and are also referred to as Public Safety Frequency Bands. These communications also may be provided using private land mobile radio services (PLMRS).

Cellular networks also provide communication between different mobile users, for example, cellular telephones. These cellular networks, as well as LMR networks, continue to be enhanced and allow for improved operation and communication. For example, cellular networks now provide Push-to-talk (PTT) services that allow direct connect capabilities. Thus, a cellular phone user may request a direct connect communication link with another cellular phone user in a two way radio or "walkie talkie" type communication. As another example, cellular networks provide high-speed data services, such as, for example, General Packet Radio Service (GPRS), Enhanced Data Rates for GSM Evolution (EDGE), Evolution Data Optimized (EV-DO) and Universal Mobile Telephone Service (UMTS).

Known systems providing enhanced services or features, such as enhanced calling or voice features, which may be used, for example, for mission critical wireless applications, such as public safety applications, use commercial cellular services, such as PTT services, to augment and or replace traditional LMR systems. These known systems are provided using specialized gateway equipment that enable certain interoperability capabilities between an LMR system and a cellular network with, for example, PTT capabilities. The interoperability is provided by translating and/or transforming the data or voice communications to be communicated between the networks, for example, from an LMR network to a cellular network.

In the LMR area, new technologies are also being provided, including the use of digital communication instead of analog communication.

Additionally, LMR systems are now using packet switching instead of circuit switching, for example, using Internet Protocol (IP) and Voice Over IP (VoIP) to enable construction of highly scalable and cost effective LMR networks.

However, these improvements also result in need to support migration to new technologies. Further, interoperability between systems deployed either by different LMR owners/operators or between different cellular carriers, particularly when different technologies are used in different systems, is increasingly important. It is known to utilize multimode terminal devices to facilitate both migration and interoperability. In LMR, these devices are often referred to as multimode radios, and in the cellular area these devices are often referred to as multimode phones.

Multimode terminal devices enable inter-system roaming, and specifically, roaming from one network and/or technology to another, without user intervention. These terminal devices change mode as a user roams between different systems provided using different technologies. Further, components for operation in multiple protocols and frequency bands may be integrated into a single terminal device. For example, in the cellular area, multimode phones can roam between TDMA and CDMA networks. In the LMR are, radios can roam between an analog trunked system and a digital trunked system.

Multimode operation is provided by the interconnection of corresponding network infrastructures. Thus, to provide transparency to a user, gateway equipment may be used to connect the various systems or networks. Known devices for communicating between different types of networks or systems use different communication components (e.g., hardware and software) each configured specifically to communicate with a particular network or system. For each system or network, the functions and operations for that system or network are implemented using the capabilities and protocols specific to that system or network. However, these systems are limited in the set of overall functions that are available because the functions and user interface available to a user depend on the system into which the terminal device has roamed.

Further, the functions of one system may differ significantly from the functions available on another system. Additionally, because of these protocol incompatibilities certain end-to-end services cannot be provided, for example, end-to-end encryption. For voice communications, the use of a gateway to interconnect systems can introduce degradation in voice quality as a result of the voice data being converted from one format to another.

Thus, these systems not only may operate at non-satisfactory quality levels, but may require additional controls and equipment to implement the interconnectivity, thereby adding complexity and cost to the overall systems.

BRIEF DESCRIPTION OF THE INVENTION

In one exemplary embodiment, a land mobile radio (LMR) is provided that includes an LMR communication portion configured to provide communication with an LMR network and a cellular data network communication portion configured to provide communication with a cellular data network.

In another exemplary embodiment, a multimode terminal device is provided that includes a land mobile radio and a cellular radio modem.

In yet another exemplary embodiment, a method of communicating land mobile radio (LMR) content using an LMR device is provided. The method includes configuring a land mobile radio to communicate LMR content using one of an LMR network and a cellular data network. The LMR content is encapsulated using a packet switching protocol when communicating using the cellular data network.

DETAILED DESCRIPTION OF THE INVENTION

Various embodiments of the present invention include a multimode terminal device having a land mobile radio (LMR) unit providing LMR content, for example, LMR services using both an LMR network and a cellular data network. The LMR content retains an LMR application layer, but instead of using the LMR frequency bands with LMR transport protocols, the LMR content is communicated using cellular frequency bands over cellular packet switched data networks.

The multimode device is configured to provide inter-system roaming between, for example, LMR systems and cellular systems. Operation using the cellular system is provided generally by including a cellular radio modem into an LMR device, and supporting LMR features through encapsulation and transport of LMR voice, data and control information, utilizing end-to-end packet switched protocols between the LMR device and a packet switched infrastructure.

In the various embodiments, the data services of a cellular system are used when communicating using the cellular system. The cellular radio modem provides data services between an application layer within the LMR device and a gateway that bridges the LMR system or network and the cellular system or network. The end-to-end protocols between the multimode LMR device and the gateway utilize encapsulation techniques to transport LMR voice and data services over the cellular data network. The processes and techniques for performing the encapsulation and packet switched transport also may be referred to as LMR-over-cellular protocols.

It should be noted that when reference is made herein to LMR content, this refers generally to any type or kind of LMR voice and/or data content, and may define particular LMR services, operations, controls, etc. For example, the LMR content may include, but is not limited to, voice data, emergency signal data, control data relating to selecting a particular talk group, LMR data for transfer between a radio unit and a server, reprogramming data (e.g., software upgrade data), etc.

A wireless communication system will first be described followed by a description of an LMR unit in accordance with various embodiments of the invention.

Figure 1:
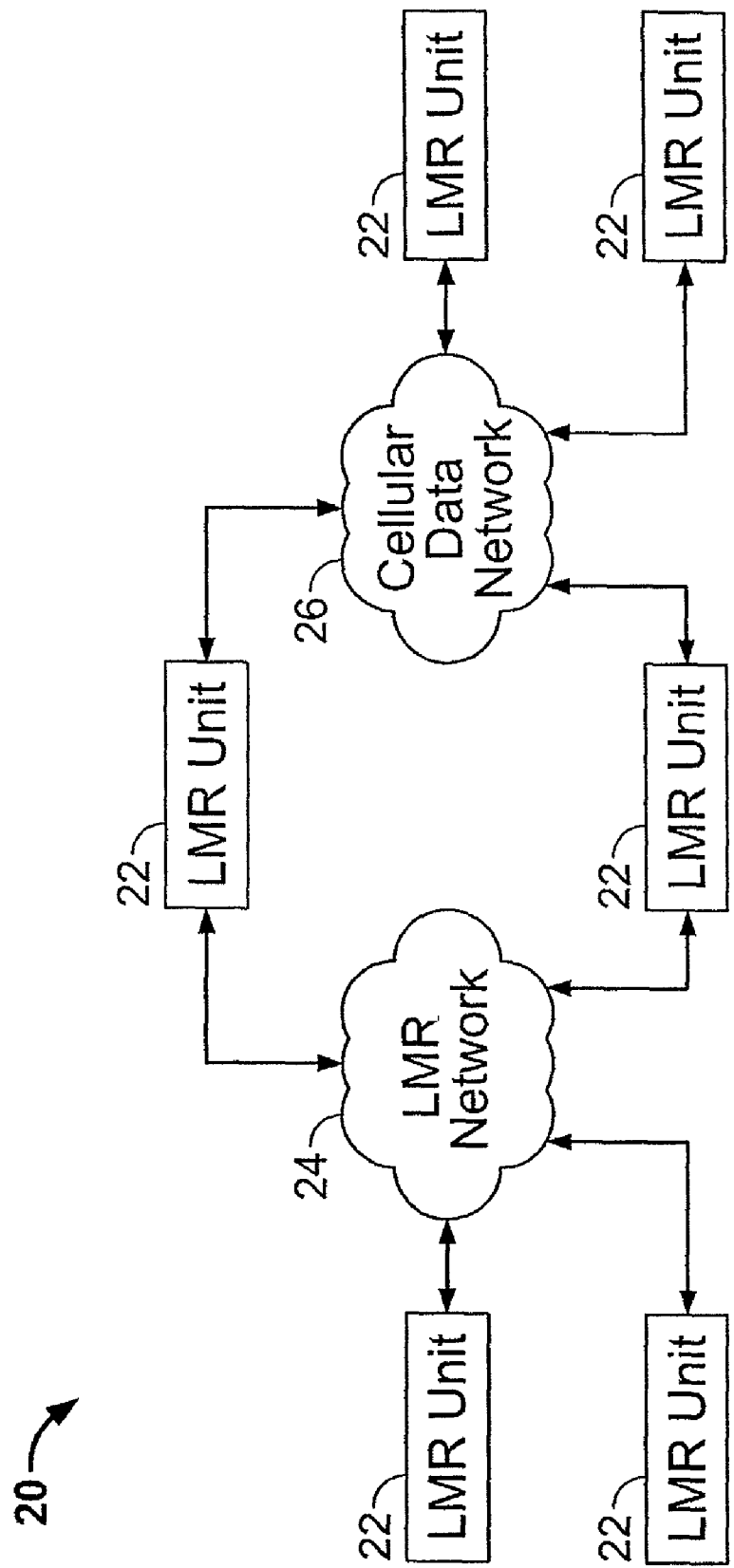
FIG. 1 is a block diagram of a Land Mobile Radio (LMR) communication system constructed in accordance with an exemplary embodiment of the present invention.

As shown in FIG. 1, a wireless communication system, and more particularly, an LMR communication system 20 constructed according to various embodiments of the invention provides communication between a plurality of multimode devices, and more particularly, a plurality of LMR units 22 or LMR terminals. Communication between the LMR units 22 is provided via either an LMR network 24 or a cellular data network 26. Each of the LMR units 22 is configured to provide communication, for example, with other LMR units 22 using one of the LMR network 24 and the cellular data network 26. In particular, each of the LMR units 22 is configured to switch between one of the LMR network 24 and the cellular data network 26, for example, based on the available network, available bandwidth, the coverage area, the communication signal strength, etc. Optionally, or in another embodiment, switching between one of the LMR network 24 and the cellular data network 26 is based on the type of communication or content. Thus, in addition to providing communication over the LMR network 24, wireless data services of the cellular data network 26 may be used to support the communication and/or transport of LMR application layer protocols.

Various embodiments of the present invention enable end-to-end LMR services to be overlaid on top of the cellular data network 26, thereby allowing, for example, implementation of mission critical LMR systems within the service area of these cellular data networks 26. In order to provide this functionality and communication of LMR content using the cellular data network 26, each of the LMR units 22, for example, LMR radios, is provided with a cellular radio modem to allow operating end-to-end LMR application layer protocols and services between the LMR units 22 and the packet switched LMR infrastructure.

Figure 2:
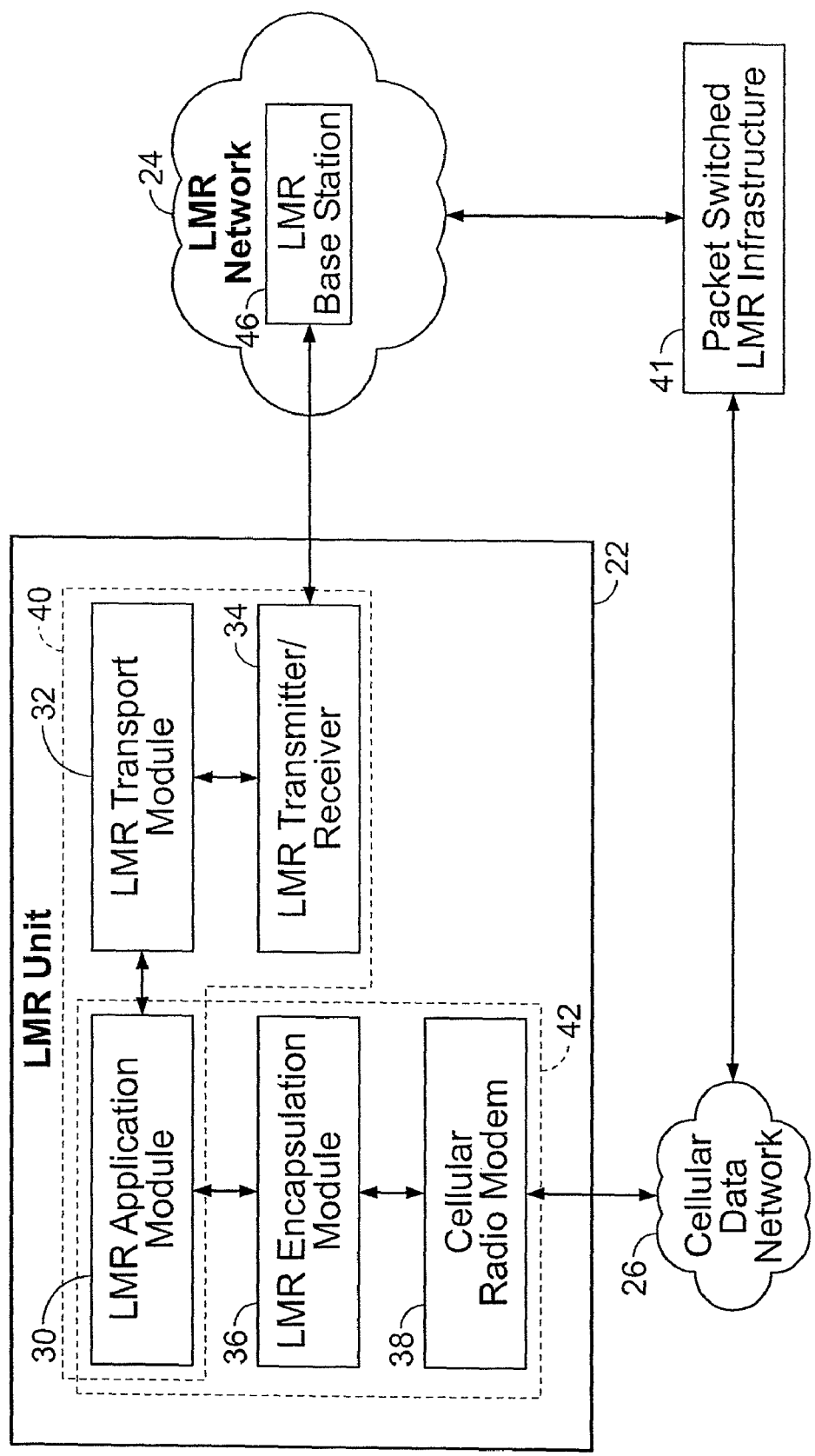
FIG. 2 is a block diagram of an LMR unit constructed in accordance with an exemplary embodiment of the present invention.

More particularly, and as shown in FIG. 2, a multimode terminal device, illustrated as the LMR unit 22, includes a plurality of modules or components configured to provide communication via the LMR network 24 or the cellular data network 26. Specifically, the LMR unit 22 includes an LMR application module 30 connected to an LMR transport module 32 for configuring voice and/or data for communication via the LMR network 24 (having one or more LMR base stations 46) using an LMR transmitter/receiver 34, which may be separate units or provided as a single transceiver (e.g., an LMR radio). The LMR application module 30, LMR transport module 32 and LMR transmitter/receiver 34 generally define an LMR communication portion 40 of the LMR unit 22. The LMR unit 22 further includes an LMR encapsulation module 36 for encapsulating the voice and/or data for communication via the cellular data network 26 using a cellular radio modem 38. The LMR application module 30, LMR encapsulation module 36 and cellular radio modem 38 generally define a cellular data network communication portion 42 of the LMR unit 22.

Figure 3:
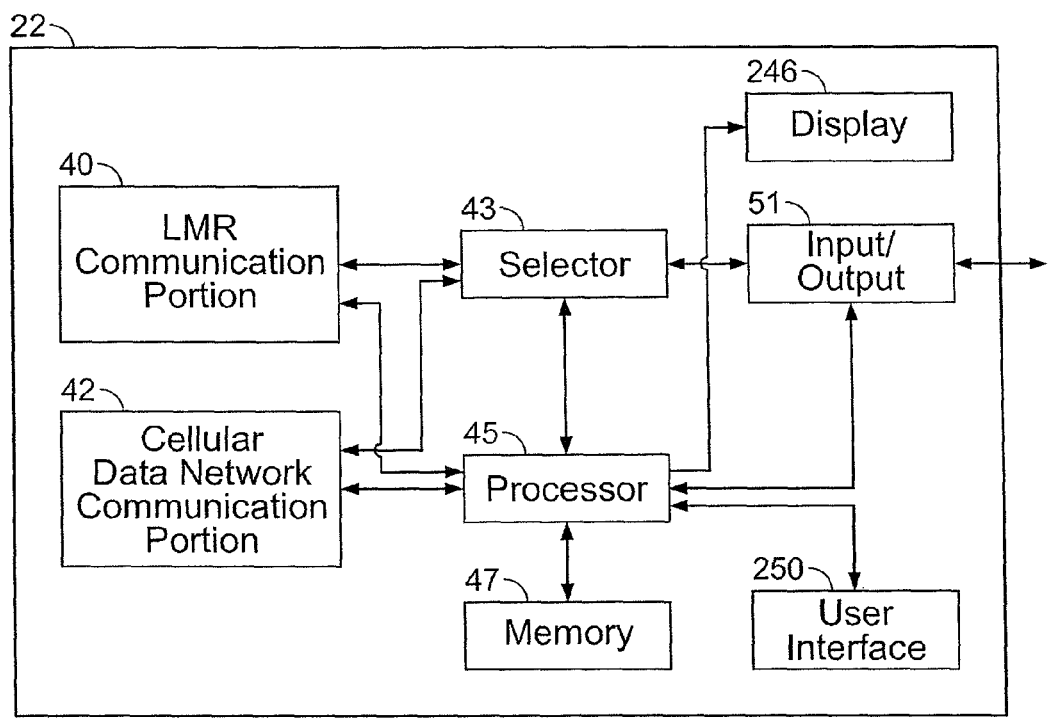
FIG. 3 is a block diagram illustrating an internal configuration of an LMR unit constructed in accordance with an exemplary embodiment of the present invention.

Specifically, and as shown in FIG. 3, the LMR unit 22 includes the LMR communication portion 40 and the cellular data network communication portion 42 each connected to a selector 43. The LMR communication portion 40, cellular data network communication portion 42 and selector 43 are each also connected to a processor 45. Further, a memory 47 (e.g., RAM and/or ROM) and a display 246 are each connected to the processor 45. An input/output 51 is connected to the processor 45 and the selector 43. A user interface 250 is connected to the processor 45.

In operation, and as described in more detail herein, the processor 45 is configured to control selection of either the LMR communication portion 40 or cellular data network communication portion 42 using the selector 43. The processor 43 may access the memory 47 to obtain, for example, user preferences or predefined operating parameters. The processor 47 also may receive inputs (e.g., commands) from a user via the user interface 250, for example, to activate or select a certain function or operation. The input/output 51 may include different transmission and/or receiving components for transmitting and receiving to and from the LMR network 24 or the cellular data network 26 (shown in FIG. 2). The display 246 displays information from the processor 45, for example, communication information, such as channel or network selection information.

Additional or different components may be provided to the LMR unit 22. For example, a global positioning system (GPS) unit may be provided as part of the LMR unit 22 to determine the location of the LMR unit 22.

Figure 4:
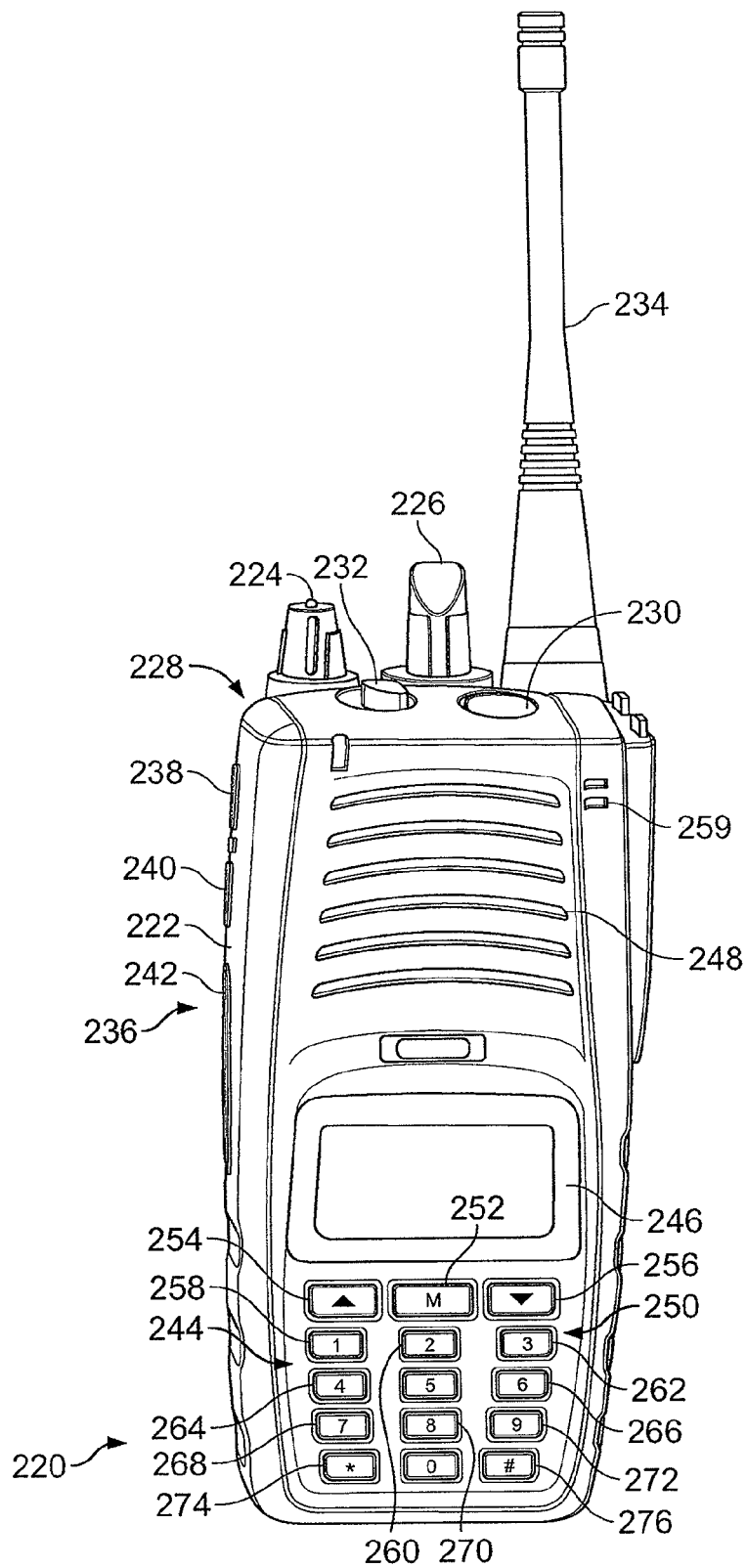
FIG. 4 is a perspective view of an LMR unit illustrating an external configuration constructed in accordance with an exemplary embodiment of the present invention.

The LMR unit 22 may be configured having different external configurations, for example, based on the specific application for the LMR unit 22. Various embodiments of different external configurations for LMR units are illustrated in FIGS. 4 through 7. It should be noted that the internal configuration for each of the LMR units is the same or similar to the configuration shown in FIGS. 2 and 3. Modifications may be made, for example, to the size of the memory 47 or display 246, or the configuration of the user interface 250. More particularly, and for illustrative purposes, as shown in FIG. 4, an LMR unit 220 may be provided as a portable or mobile unit having a housing 222 configured for handheld operation. The LMR unit 220 includes a power/volume knob 224 on a top portion 228 of the LMR unit 220 to turn power on and off and to control volume. A system or channel knob 226 on the top portion 228 of the LMR unit 220 is provided to, for example, change channels or talk groups within a particular network (e.g., LMR network 24 or cellular data network 26) and may have a predetermined number of rotary positions. An emergency button 230 and a selector knob 232 are also provided on the top portion 228. The emergency button 230 is used to transmit an emergency signal to other LMR units, which provides an alert to the other units. The selector knob 232 is used to select a bank or set of channels or talk groups. An antenna 234 extends from the top portion 228 to facilitate bi-directional communication with the LMR unit 220.

A side portion 236 of the LMR unit 220 also includes control members for controlling operation of the LMR unit 220. In this embodiment, an option button 238, a clear/monitor button 240 and a push-to-talk (PTT) button 242 are all provided on the side portion 236. The option button 238 is used to select different options, for example, within a particular operating mode (e.g., high/low power settings, keypad lock, display contrast, keypad lighting, etc.) and the clear/monitor button is used, for example, to clear a setting or end a call. The PTT button 244 is used to activate and deactivate PTT operations.

A front portion 244 of the LMR unit 220 generally includes the display 246, a speaker 248, a microphone 259 and a user interface 250. The user interface 250 includes a plurality of user depressible buttons that may be used, for example, for entering numeric inputs and selecting various functions of the LMR unit 220. This portion of the user interface may be configured, for example, as a numeric keypad. Additional control buttons also may be provided, for example, a menu button 252 and an increase and a decrease button 254 and 256, respectively. The increase button 252 and decrease button 254 may be used to provide the same functions as other user inputs, for example, correspond to the same operations as the system or channel knob 226. The menu button 252 is used to access a stored menu and/or activate an item within a list displayed on the display 246.

With respect to the plurality of user depressible buttons corresponding to numeric inputs, each may also provide control or activation of a particular function of the LMR unit 220. For example, numeric button (1) 258 also may be used to select a specific system or network, for example, the LMR network 24 or cellular data network 26 (shown in FIGS. 1 and 2), which switches between the LMR communication portion 40 and the cellular data network communication portion 42 (shown in FIG. 2), respectively. Numeric button (2) 260 also may be used to select a specific group of users, for example, a predetermined group of users on a particular system. Numeric button (3) 262 also may be used to select a scan mode of operation for scanning channels within a particular system or network. Numeric button (4) 264 also may be used to activate encryption, for example, turn on and off a private encryption mode. Numeric button (6) 266 also may be used to add a group or channel for accessing with the LMR unit 220. Numeric button (7) 268 also may be used to access or provide to another LMR unit status of the LMR unit 220. Numeric button (8) 270 also may be used to access a list of predetermined messages that can be transmitted by the LMR unit 220. Numeric button (9) 272 also may be used to delete selected groups or channels of a currently selected system within a scan list. Button (*) 274 also may be used to initiate a interconnect call with other units. Button (#) 276 also may be used to initiate an individual call.

The display 246 may be configured having a plurality of lines, for example, for displaying a system designation on one line, a group designation on another line and icons or other information (e.g., mode of operation) on additional lines. Other information may be provided on the display 246, for example, a battery power level indicator.

Figure 5:
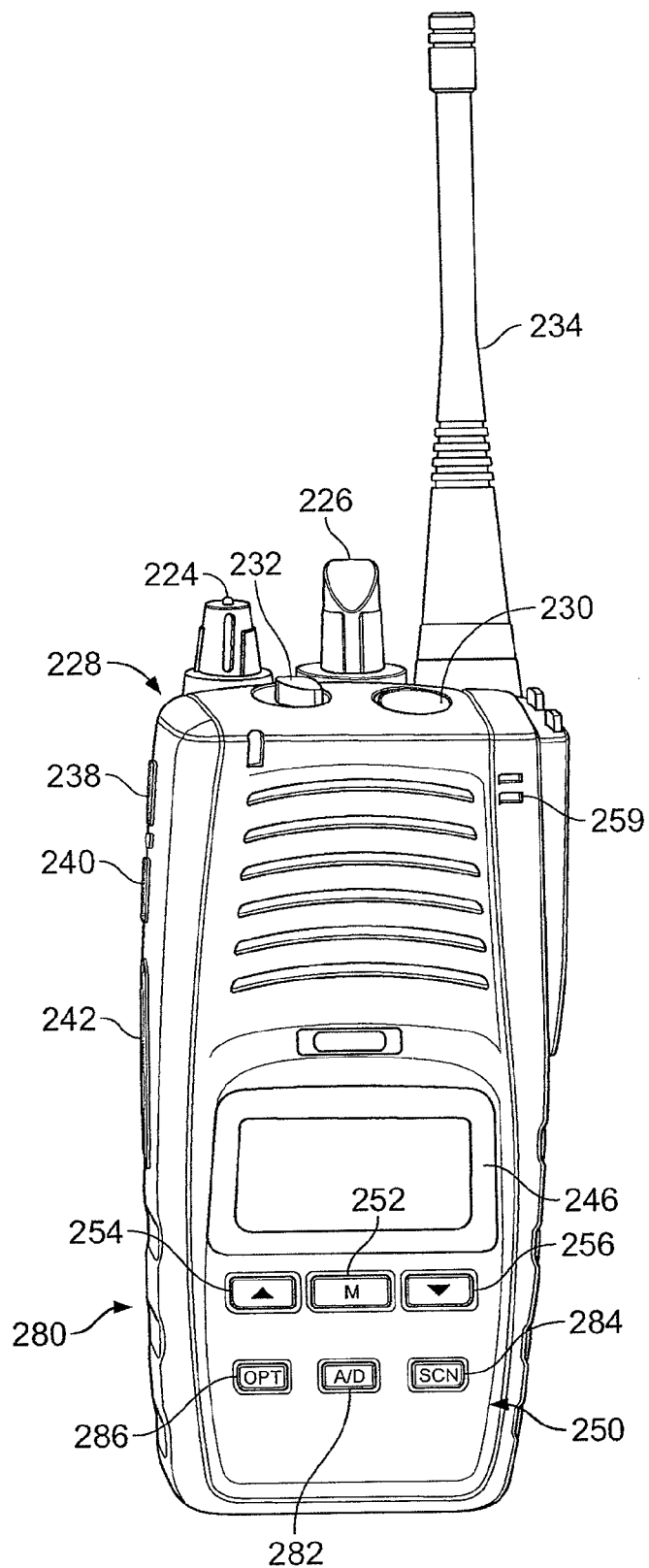
FIG. 5 is a perspective view of an LMR unit illustrating an external configuration constructed in accordance with another exemplary embodiment of the present invention.

The LMR unit 220 also may be referred to as a system unit. An LMR unit 280 configured as a scan unit is shown in FIG. 5. Like numerals represent like components as shown in FIG. 4. The user interface 250 of the LMR unit 280 includes only an A/D button 282 to add and delete selected talk groups or channels from a scan list of a currently selected system, an SCN button 284 to turn on and off a scan operation and an OPT button 286 to activate one or more options.

Figure 6:
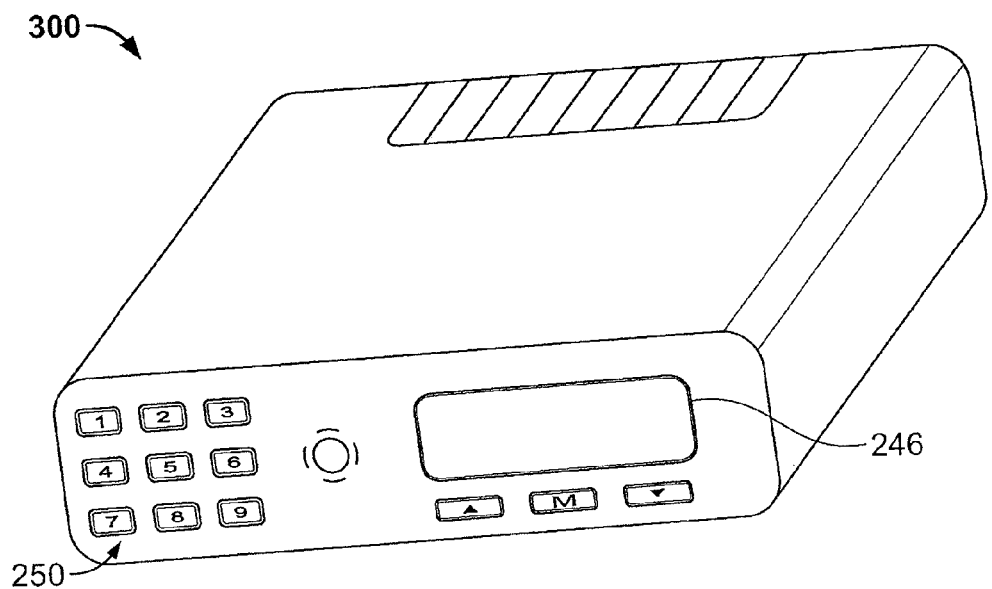
FIG. 6 is a perspective view of an LMR unit illustrating an external configuration constructed in accordance with another exemplary embodiment of the present invention.
Figure 7:
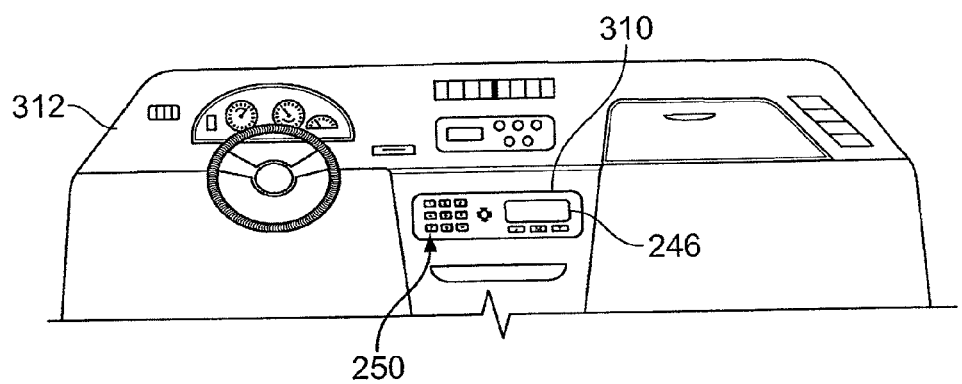
FIG. 7 is an elevation view of an LMR unit illustrating an external configuration constructed in accordance with another exemplary embodiment of the present invention.

Various other embodiments provide configurations of LMR units for use in different applications or in different settings. For example, an LMR unit 300 as shown in FIG. 6 may be configured for desktop or dashboard operation (e.g., mounting thereon) and an LMR unit 310 as shown in FIG. 7 may be integrated within a dashboard 312 of, for example, an automobile. Like numerals in FIGS. 6 and 7 correspond to like numerals in FIGS. 4 and 5.

The LMR units may include additional components, for example, filters (not shown), such as a receive filter and a transmit filter for filtering signals that are received and transmitted, respectively, by the LMR units. The LMR units also may include, for example, a dedicated switch (not shown) or other controller for switching between the LMR communication portion 40 and the cellular data network communication portion 42 (shown in FIG. 2).

It should be noted when reference is made below to LMR unit 22, any of the various embodiments may be used, including LMR units 220, 280, 300 and 310.

In operation, the LMR system 20 may provide communication via the LMR network 24 using different known protocols, for example, LMR airlink protocols. For example, these LMR airlink protocols include the Project 25 (TIA 102) and ETSI TETRA standards, among others. These LMR airlink protocols specify the format and procedures for information exchange between the LMR unit, for example, LMR unit 22 and the LMR network 24, and in particular, the LMR base station 46. It should be noted that when the base station(s) 46 are part of a larger system, the base station(s) 46 are interconnected to switching equipment (not shown) that routes voice and data between different parts of the system, such as to other LMR base stations or dispatch consoles.

As is known, the LMR base station 46 processes, for example, manipulates, the voice, data and control information received over the airlink into an alternate format suitable for communication within the LMR network 24, for example, for transport to switching equipment. For example, received discrete voice, data and control transmissions may be encapsulated in TCP/IP or UDP/IP packets as is known, with the resultant IP packets communicated between the LMR base station(s) 46 and the switching equipment over an IP network.

The LMR unit 22 also may provide communication via the cellular data network 26 using different known protocols, for example, General Packet Radio Service (GPRS), Enhanced Data Rates for GSM Evolution (EDGE), Evolution Data Optimized (EV-DO), Universal Mobile Telephone Service (UMTS), and 802.16 standards, among others. These cellular protocols specify the format and procedures for information exchange between the LMR unit 22 and in particular, the cellular radio modem 38, and the cellular data network 26.

For example, a cellular tower (not shown) having base station (not shown) may be provided for receiving and processing signals from the LMR unit 22, for example, manipulating the received voice, data and control information into an alternate format suitable for communication within the cellular data network 26, for example, for transport to a router and server (not shown) based on an IP address for the data packets received. For example, received encapsulated signals are decapsulated and appropriately routed within the cellular data network 26.

Figure 8:
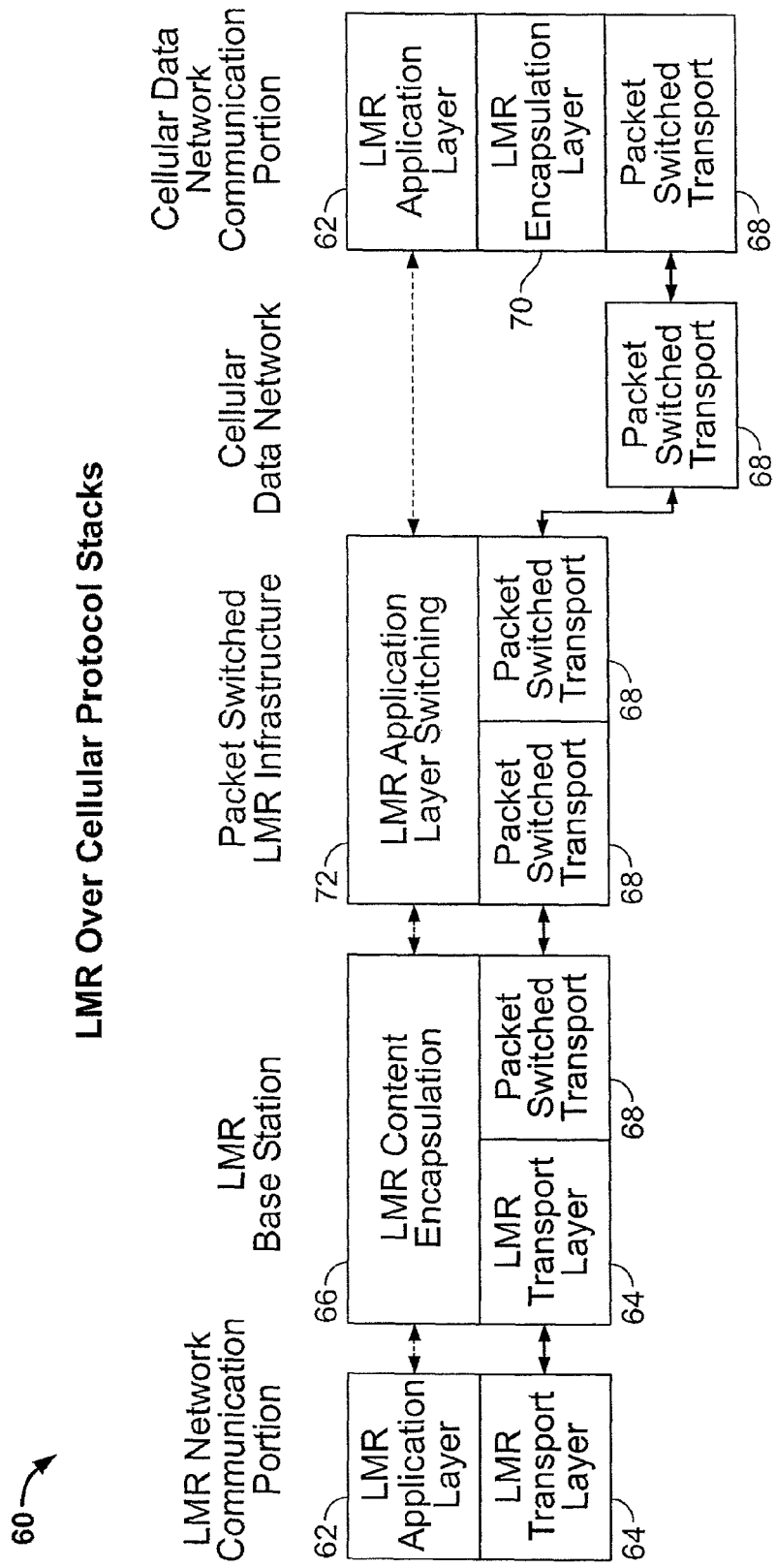
FIG. 8 is a block diagram illustrating protocol stacks in accordance with an exemplary embodiment of the present invention.

Thus, communication of data from either the LMR network 24 or the cellular data network 26 to a packet switched LMR infrastructure 41 is provided. It should be noted that the LMR content and LMR network may be configured based on different airlink protocols. In order to provide communication via either the LMR network 24 or the cellular data network 26 using the LMR unit 22 the communication protocol stacks for communication with each of these networks is partitioned as shown in FIG. 8. In particular, and with respect to communication with the LMR unit 22 using the LMR network 24, the LMR protocol stack 60 is partitioned into multiple layers, which in an exemplary embodiment, is a two-layer protocol stack having an LMR application layer 62 and an LMR transport layer 64. The application layer 62 and the LMR transport layer 64 may be provided, for example, by the LMR application module 30 and LMR transport module 32 (both shown in FIG. 2), respectively. The LMR application layer 62 is configured to provide interpretation and processing of the voice, data and control information and the LMR transport layer 64 is configured to provide delivery of the voice, data and control information over the transmission medium. As described herein, an LMR airlink protocol defines the both the LMR application layer 62 and the LMR transport layer 64.

In this two-layer protocol stack model, the LMR base station 46 (shown in FIG. 2) and switching equipment in the LMR network 24 (shown in FIG. 2) receive content from the LMR communication portion 40 (shown in FIG. 2) and communicate content of the LMR application layer 62 therebetween with a different transport layer. In particular, and as shown in FIG. 3, the content of the application layer 62 is encapsulated at the LMR base station 46 (shown in FIG. 2) using LMR content encapsulation 66 as is known. In an exemplary embodiment, discrete transmission units are encapsulated within transport datagrams, and in particular, packet switched transport datagrams 68, that are communicated using a transport protocol. Upon receipt of an encapsulated datagram, the application layer content then may be recovered, and in particular, decapsulated.

Further, this two-layer protocol stack model enables delivering LMR application layer services over non-LMR wireless networks using, for example, the cellular data network communication portion 42 (shown in FIG. 2). Specifically, the cellular data network communication portion 42 is configured to provide the LMR application layer 62, but instead of using the LMR transport Layer 64, the transport services of a wireless cellular data network 26 (shown in FIG. 2) are used. In particular, an LMR encapsulation layer 70 is used with the packet switched transport datagrams 68 such that the wireless cellular data network 26 communicates with switching equipment using suitable transport protocols, thereby delivering the identical LMR application layer services as the LMR communication portion 40. Specifically, the packet switched LMR infrastructure 41 (shown in FIG. 2) communicates the LMR application services using LMR application layer switching 72 in combination with packet switched transport datagrams 68.

It should be noted that the various embodiments are not limited to a two-layer protocol stack and additional layers may be provided to the multi-layer protocol stack as desired or needed. For example, different session layers, such as a bulk encryption layer may be provided. Further, and for example, an RTP layer may be provided.

Figure 9:
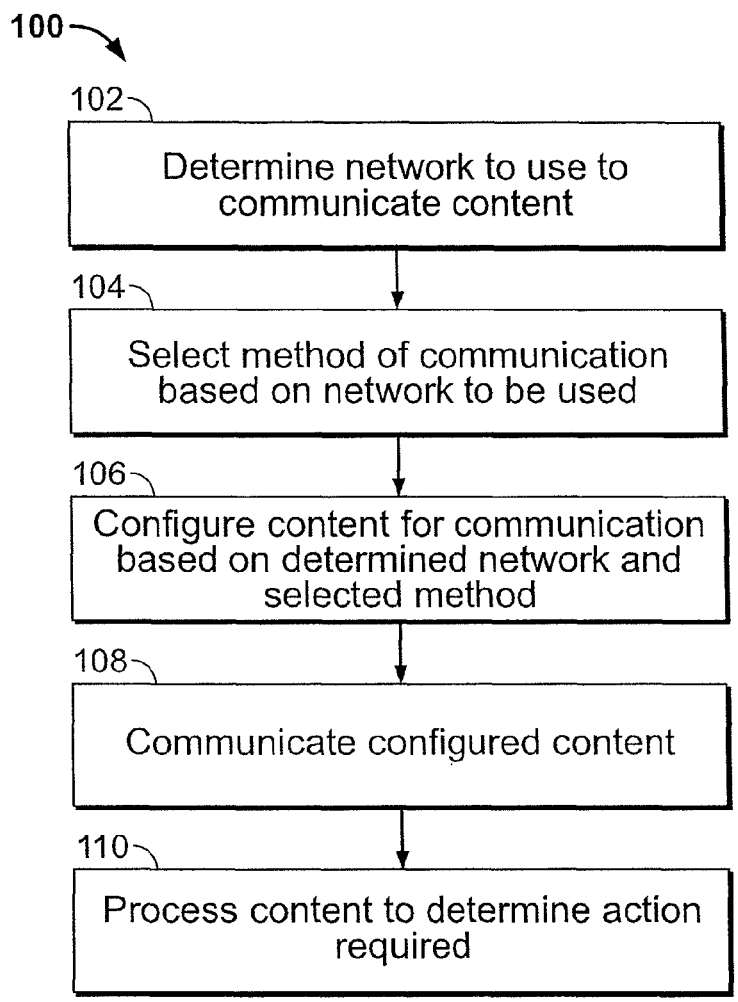
FIG. 9 is a flowchart of a method for controlling communication of LMR content in an LMR communication system in accordance with an exemplary embodiment of the present invention.

Various embodiments of the present invention provide for controlling communication of LMR content in an LMR communication system using an LMR network and a non-LMR wireless network, in particular, a wireless cellular data network. In particular, a method 100 of controlling communication of LMR content is shown in FIG. 9 and includes determining at 102 the network to use to communicate the LMR content. In an exemplary embodiment, a determination is made as to whether the LMR content is to be communicated using an LMR network or a cellular data network. The determination may be based on a manual selection, for example, based on a user input selection of which network to use. The selection may be made, for example, using a button or switch on the LMR unit 22 (shown in FIG. 2). Alternatively or optionally, the determination of which network to use may be automatic. For example, the selection of a network for communicating LMR content may be based on the amount of data traffic on a particular network or available bandwidth, a transmission priority level, the type of communication or content (e.g., voice or emergency broadcast signal, emergency communication or PTT request), the signal strength for the LMR unit, the geographic location of the LMR unit, a user preference, etc. The operation and selection of the network to use when communicating with the LMR unit is described in more detail below in connection with FIG. 12.

After a determination of the network to use to communicate the LMR content is made at 102, a method of communication is selected at 104 based on the determined network to use. For example, the speed or baud rate of the communication may be selected (manually or automatically) from a range of communication data rates. Additionally, the setup procedures for establishing and connecting to the determined network may be selected. For example, if the LMR network is to be used, an LMR network communication setup routine may be executed wherein a communication link is established between the LMR unit and the LMR network via an LMR transmitter/receiver within the LMR unit. If the cellular data network is to be used, a cellular data network communication setup routine may be executed wherein a communication link is established between the LMR unit and the cellular data network via a cellular radio modem of the LMR unit. The setup routine may include any suitable process as is known for establishing a wireless communication link.

Thereafter, at 106 the LMR content is configured for communication based on the determined network and selected method of communication. For example, if the LMR content is to be communicated using the LMR network, a selection of a particular LMR standard in which to configure or format the LMR content is selected. In particular, an LMR standard in which to configure the voice and/or data payload defining the LMR content is selected. This may include, for example, selecting one of a Project 25 (TIA 102) or an ETSI TETRA standard for the method of communication. Further, and for example, a proprietary format may be selected, for example, an OpenSky M/A-COM proprietary format, a NetworkFirst or EDACS system proprietary format.

Further and for example, if the LMR content is to be communicated using the cellular data network, a selection of a particular wireless cellular data network standard in which to configure or format the LMR content is selected. In particular, a wireless cellular standard in which to configure the voice and/or data payload defining the LMR content is selected. This may include, for example, selecting one of a General Packet Radio Service (GPRS), Enhanced Data Rates for GSM Evolution (EDGE), Evolution Data Optimized (EV-DO), Universal Mobile Telephone Service (UMTS) or 802.11 system standard.

Additionally, and as described in more detail above in connection with FIG. 8, depending on the network to be used to communicate the LMR content, a particular protocol stack may be used. Further, if the LMR content is to be communicated using the LMR network, an LMR protocol header is added to the LMR data payload. If the LMR content is to be communicated using the cellular data network, then a packet switch protocol header is added. As described in more detail below, if the LMR content is to be communicated using the cellular data network, then the LMR content is encapsulated, for example, Internet Protocol (IP) encapsulated with an IP wrapper prior to communicating to or from the cellular data network. The method for encapsulating the data is described in more detail below in connection with FIG. 13.

Referring again to FIG. 9, after the LMR content is configured at 106, the configured LMR content is communicated at 108. For example, if the LMR content is configured for communication using the LMR network, an LMR transmitter and receiver may be used to communicate the LMR content. If the LMR content is configured for communication using the cellular data network, a cellular radio modem may be used to communicate the LMR content. It should be noted that the cellular radio modem may be configured to operate in a single mode of operation or may be configured to operate in a multiple modes. In another embodiment, more than one cellular radio modem may be provide, each of which may be configured to operate in a single mode of operation or may be configured to operate in multiple modes of operation.

After the LMR content is communicated and received, for example, by a base station of the network, the LMR content is processed at 110 to determine an action. For example, this may include a determination to communicate voice data or to issue an emergency signal or PTT request to a talk group. For example, if the LMR content is communicated using the cellular data network, the IP destination address of an encapsulated datagram may first be determined and then communicated to that location for processing using a router in the network.

Figure 10:
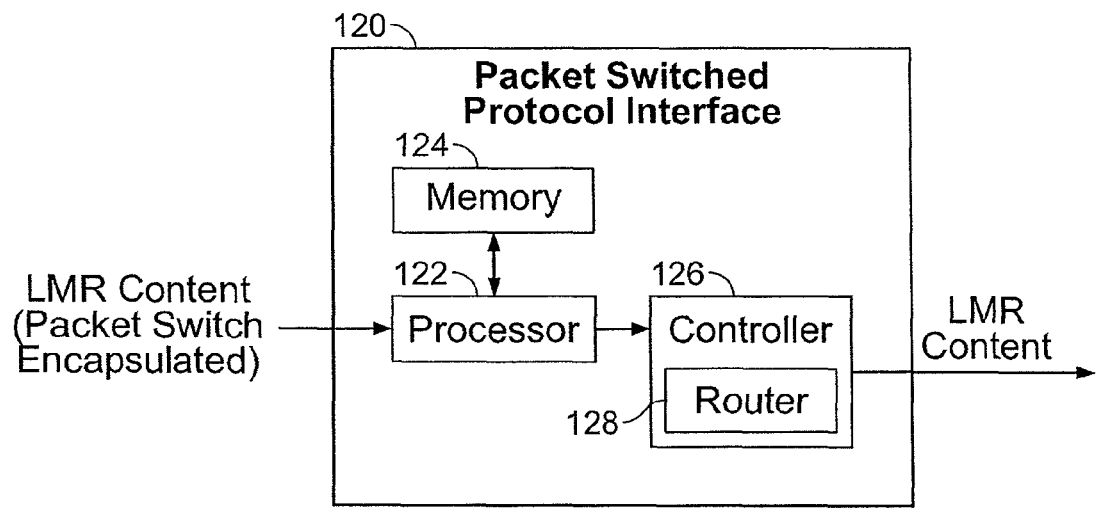
FIG. 10 is a block diagram of a packet switched protocol interface constructed in accordance with an exemplary embodiment of the present invention.
Figure 11:
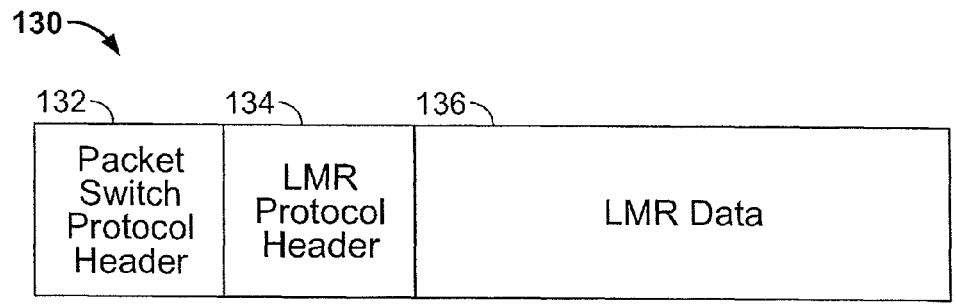
FIG. 11 is a block diagram showing formatted LMR content in accordance with an exemplary embodiment of the present invention.

Referring now to FIG. 10 and an another embodiment of the present invention, a packet switched protocol interface 120 may be provided in connection with the cellular data network 26 (shown in FIG. 2). The packet switched protocol interface 120 may be provided, for example, as a separate unit (e.g., stand alone module), a card for connection to a server within the cellular data network or software for downloading to a server within the cellular data network. The packet switched protocol interface 120 includes a processor 122 for processing received packet switched encapsulated LMR content for communication to, for example, the packet switched LMR infrastructure 41 (shown in FIG. 2). In particular, and as described in more detail herein, the processor may receive LMR content formatted as shown in FIG. 11. The LMR content generally includes an LMR data portion and a packet switching protocol encapsulation portion. Specifically, the LMR content 130 may include a packet switch protocol header 132, an LMR protocol header 134 and LMR data 136, for example, an LMR data payload.

This LMR content 130 is essentially encapsulated, for example, encapsulated in an IP wrapper. The processor 122 decapsulates the LMR content 130, for example, by removing the packet switch protocol header 132 and may store the decapsulated LMR content 130 in a memory 124. The LMR content 130 then may be further processed by the processor 122 to determine an action to be performed or an address within the packet switched LMR infrastructure to which the LMR content 130 is to be communicated. Essentially, once the LMR content 130 is decapsulated, the LMR content 130 is configured for communication within a packet switched LMR infrastructure or an LMR network. The control of communication of the LMR content 130 is controlled by a controller 126 that may include a router 128 for routing the LMR content 130 to a destination within, for example, the LMR network. It should be noted that the LMR content may be reencapsulated for transmission within the LMR network or within the cellular data network.

Figure 12:
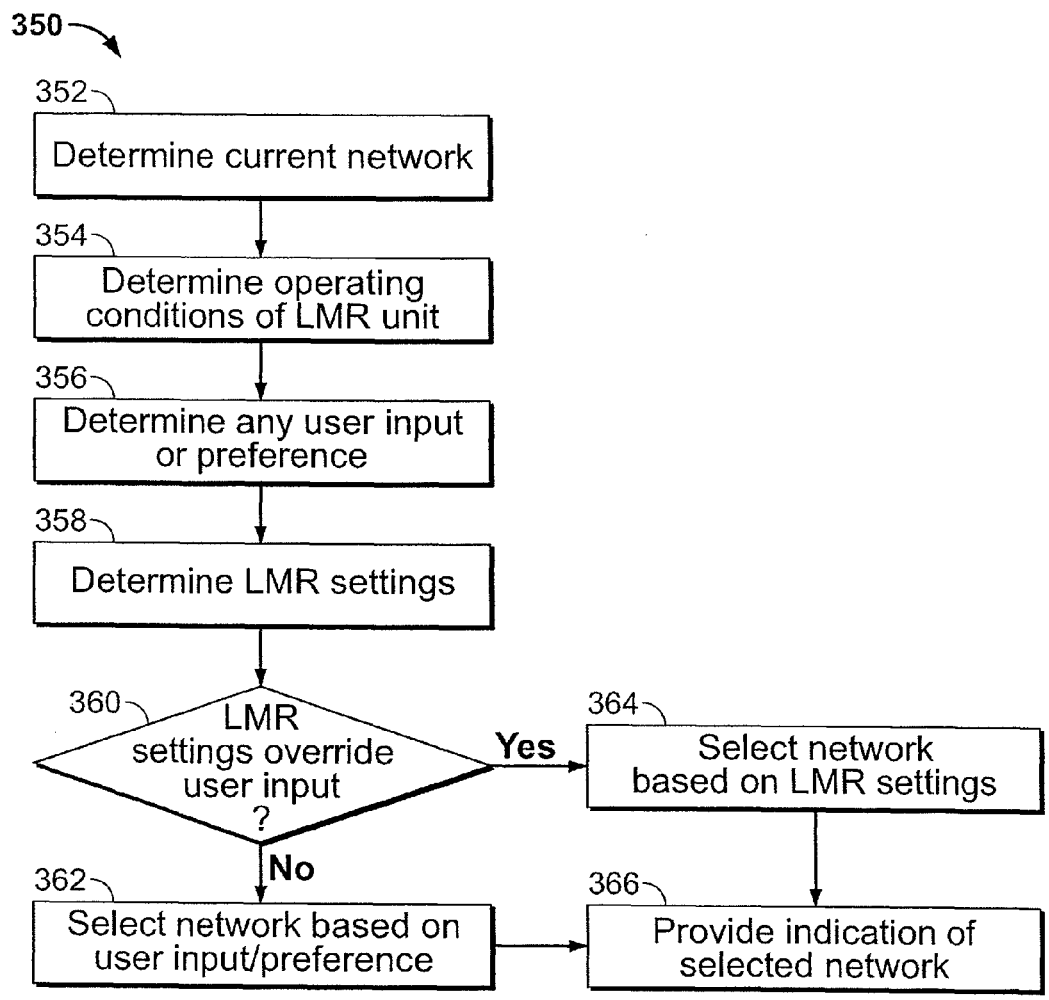
FIG. 12 is flowchart of a method for selecting the operating mode of an LMR unit in accordance with an exemplary embodiment of the present invention.

The operation and selection of the network to use by the LMR unit, and more particularly, the selection of either an LMR network or a non-LMR network, for example, a cellular data network, to communicate the LMR content will now be described. In general, an LMR unit may automatically select the network to use based on, for example, a user setting, a predetermined setting, a user defined setting, an operating condition of the LMR unit, etc. The system selection also may be made by a user using a selector or input on the LMR unit. A method 350 for selecting the operating mode of the LMR unit, and more particularly, for determining when to use a particular network for communication is shown in FIG. 12. Specifically, a determination is made at 352 as to the current network or communication system being used. Next, a determination of the operating conditions of the LMR unit is made at 354. This may include, for example, the current signal strength, the current geographic location, etc. Thereafter, at 356, a determination is made as to any user input or preference for a particular network. For example, a user may input a particular network preference based on geographic area, such as a preference for using an LMR network in an area where the user knows that the cellular data network coverage is weak or alternatively for using a cellular data network where the user knows there is no LMR network coverage. The user preference also may be, for example, to first always use a cellular data network if available. The input also may be based on a manual user selection of the LMR network or the cellular data network using a button or selector on the LMR unit.

Thereafter at 358 a determination is made as to the LMR settings of the LMR unit. This may include, for example, determining preprogrammed settings or preferences for the LMR unit, such as, for example, based on threshold levels of data traffic on a particular network or available bandwidth on that network, a transmission priority level, the type of communication or content (e.g., voice or emergency broadcast signal, emergency communication or PTT request), the current network being used for communication, etc. A determination is then made at 360 as to whether the LMR settings override the user input or preference, or vice versa. For example, the LMR unit may be configured such that an emergency broadcast message must be transmitted over the LMR network and this overrides any user inputs or preferences. If the LMR settings do not override the user inputs or preferences, then at 362 a network to use for communication is selected based on the user inputs or preferences and the corresponding communication portion of the LMR unit is accessed, for example, the LMR communication portion 40 of the LMR unit 22 or the cellular data network communication portion 42 of the LMR unit 22 (all shown in FIG. 2). This also may include using the determined operating conditions of the LMR unit to make the selection.

If at 360 a determination is made that the LMR settings override the user inputs or preferences then at 364 the network to use for communication is selected based on the LMR settings. This also may include using the determined operating conditions of the LMR unit to make the selection. It should be noted that selection of the network to use at either 362 or 364 may result in a new network selected or no change in the network (i.e., continue using the current network for communication). Further, after the selection of the network at either 362 or 364, if the network is changed then an indication may be provided at 366, for example, and audible indication (e.g., sound) or visual indication (e.g., LED on LMR unit illuminated or network selection displayed on display).

The method 350 may be performed, for example, periodically or upon certain events such as a user input, change in operating condition of the LMR unit, which may include exceeding a predetermined threshold, etc.

Figure 13:
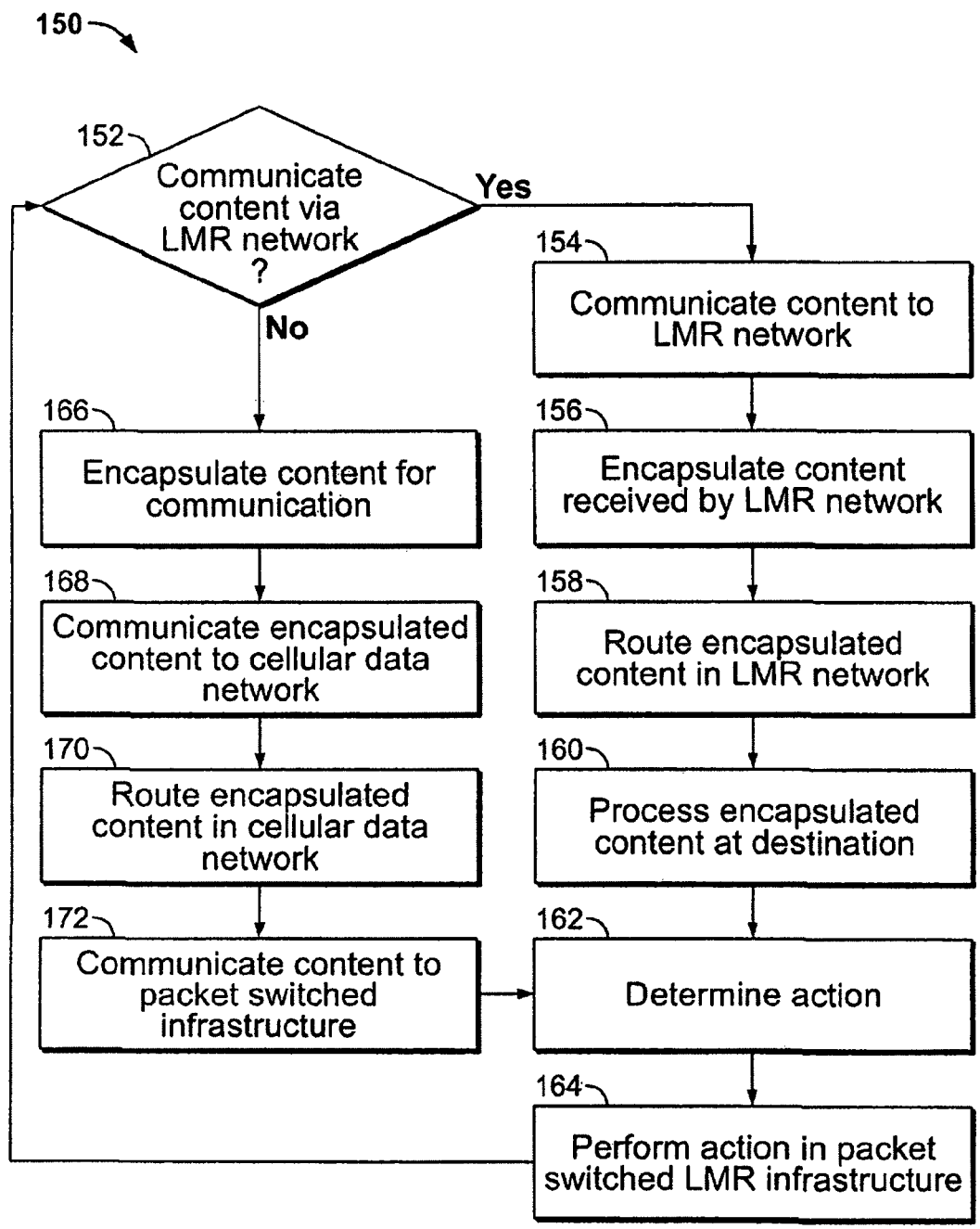
FIG. 13 is a flowchart of a method for processing LMR content in accordance with an exemplary embodiment of the present invention.

Referring now to FIG. 13 and a method 150 for processing the LMR content, at 152 a determination is made as to whether the LMR content is to be communicated using an LMR network. If a determination is made at 152 that the LMR content is to be communicated using an LMR network then at 154 the LMR content is communicated to the LMR network. This may include communicating the LMR content to a base station of the LMR network based on an LMR protocol header provided in combination with the LMR content. Thereafter, the LMR content is encapsulated at 156, for example, encapsulated in a wrapper defined by the airlink protocol as described herein and routed accordingly at 158. For example, the encapsulated LMR content, which may be configured as a datagram, may be routed within the packet switched LMR infrastructure.

At the destination of the LMR content, the LMR content is processed at 160, for example, decapsulated and then an action determined at 162 based on the processed data. For example, a determination may be made at 162 that an emergency signal is to be transmitted or that the LMR content is to be further routed to another base station. The corresponding action is then performed at 164, for example, within the packet switched LMR infrastructure.

If a determination is made at 152 that the LMR content is not going to be communicated using the LMR network, then the LMR content is encapsulated for communication at 166. For example, in an exemplary embodiment, the LMR encapsulation module 36 (shown in FIG. 2) implements the LMR encapsulation layer 70 (shown in FIG. 8) to encapsulate the LMR content in a wrapper, for example, an IP wrapper. The encapsulated LMR content is then communicated using a cellular data network at 168. This may include routing the encapsulated LMR content in the cellular data network at 170. The LMR content is then communicated to the packet switched infrastructure at 172, for example, based on the IP address from the IP wrapper.

The LMR content is then processed at a destination, which may include decapsulating the LMR content and determining an action at 162. For example, a determination may be made that an emergency signal is to be transmitted or that the LMR content is to be further routed to another base station. The corresponding action is then performed at 164, for example, within the packet switched LMR infrastructure.

Figure 14:
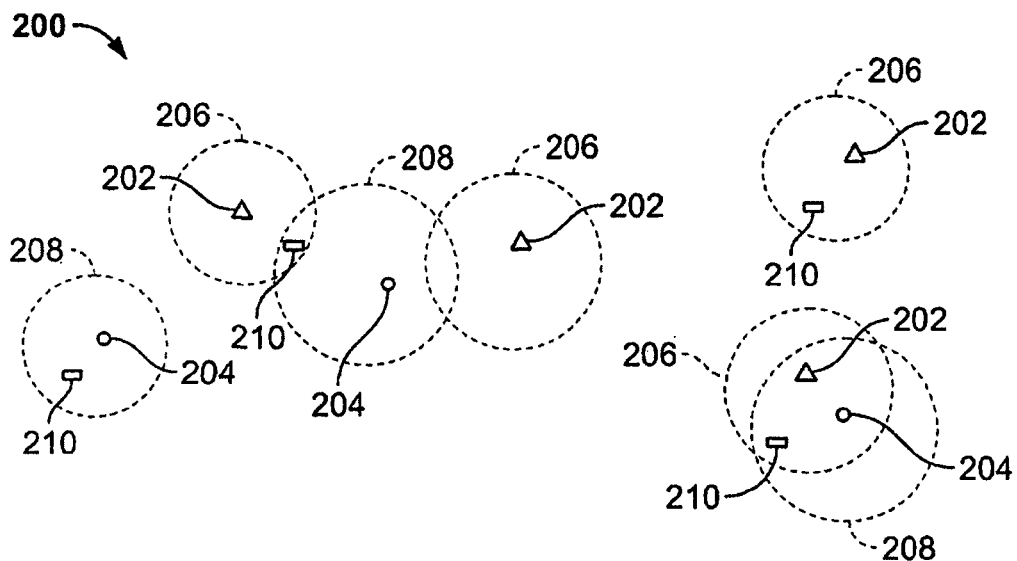
FIG. 14 is a block diagram of an LMR communication system constructed in accordance with an exemplary embodiment of the present invention showing communication coverage areas.

Thus, various embodiments of the present invention provide for communicating LMR content using an LMR network or a non-LMR network, for example, a cellular data network. If the LMR content is to be communicated using the cellular data network, the LMR content is encapsulated into a packet switching protocol before transmission. For example, and as shown in FIG. 14, an LMR communication system 200 generally includes a plurality of cellular data network base stations 202 and a plurality of LMR network base stations 204. Each of the plurality of cellular data network base stations 202 and plurality of LMR network base stations 204 have a corresponding cellular data network communication coverage area 206 and an LMR network communication coverage area 208, respectively. The cellular data network communication coverage area 206 and LMR network communication coverage area 208 may be overlapping at some locations. The various embodiments of the invention as described herein allow an LMR unit 210, for example, an LMR radio in a mobile unit or vehicle, to communicate via either a cellular data network or an LMR network depending on, for example, the location of the LMR unit 210 and the corresponding available coverage area. More particularly, communication towers (not shown) corresponding to each of the plurality of cellular data network base stations 202 and each of the plurality of LMR network base stations 204 allow wireless communication as described herein.

Figure 15:
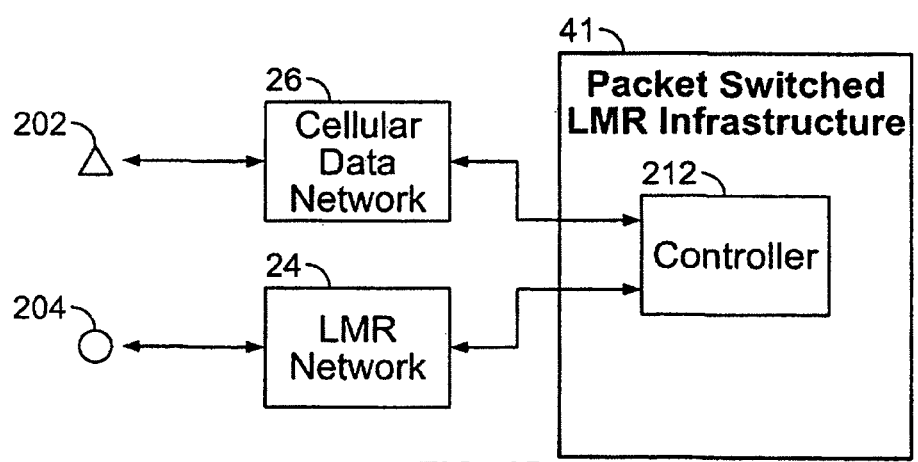
FIG. 15 is block diagram of an LMR communication system constructed in accordance with an exemplary embodiment of the present invention showing data flow.

Further, as shown in FIG. 15, a controller 212 within the packet switched infrastructure 41 may be configured to control communications from the plurality of cellular data network base stations 202 and plurality of LMR network base stations 204 as described herein. The controller may process a plurality of data packets received from either the LMR network 24 and/or cellular data network 26 to determine an appropriate action or routing procedure for the particular data packets as described herein.

The various embodiments or components, for example, the LMR communication system 20 or controllers therein, or the LMR units or controllers therein, may be implemented as part of one or more computer systems, which may be separate from or integrated with the LMR communication system 20 or LMR unit, respectively. The computer system may include a computer, an input device, a display unit and an interface, for example, for accessing the Internet. The computer may include a microprocessor. The microprocessor may be connected to a communication bus. The computer may also include a memory. The memory may include Random Access Memory (RAM) and Read Only Memory (ROM). The computer system further may include a storage device, which may be a hard disk drive or a removable storage drive such as a floppy disk drive, optical disk drive, and the like. The storage device may also be other similar means for loading computer programs or other instructions into the computer system.

As used herein, the term "computer" may include any processor-based or microprocessor-based system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer system executes a set of instructions that are stored in one or more storage elements, in order to process input data. The storage elements may also store data or other information as desired or needed. The storage element may be in the form of an information source or a physical memory element within the processing machine.

The set of instructions may include various commands that instruct the computer as a processing machine to perform specific operations such as the methods and processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It also should be noted that the various embodiments of the present invention also may provide different and/or additional functionality. For example, end-to-end encryption may be performed, thereby eliminating the use of intervening encryption equipment and the security risk encountered by having such intervening equipment with access to encryption keys. Further, various embodiments of the present invention may provide end-to-end digital voice coding, thereby eliminating the use of intervening transcoding equipment and hence the fidelity loss encountered when one digital voice format is converted to another format.

Additionally, the various embodiments of the present invention may provide mission critical functions such as, for example, PTT, scanning, priority calls with preemption, emergency alerting and notification, content scanning and tracking, navigation, dispatch and GPS location. The mission critical functions may be implemented in different mission critical applications, including, but not limited to, public safety, utility industry and public transit industry.

Thus, the various embodiments provide multimode operation that allows implementing the same features, functions and user interface, independent of the system (e.g., LMR network or cellular network) on which the LMR unit is operating. The various embodiments also allow end-to-end encryption between LMR devices across different systems. Additionally, coding and recoding of the voice content is eliminated, thereby preserving voice quality.

While the invention has been described in terms of various specific embodiments, those skilled in the art will recognize that the invention can be practiced with modification within the spirit and scope of the claims.

We claim:

1. A method for providing land mobile radio (LMR) services using a cellular data network, the method comprising:
    selecting, by an LMR radio unit, one of an LMR communication module and a cellular data network communication module for facilitating communication of LMR content therefrom to an LMR base station;
    if said LMR communication module is selected, then
        generating, by a common LMR application module, said LMR content formatted in accordance with an LMR application layer protocol format, said common LMR application module included within said LMR communication module and said cellular data network communication module,
        configuring said LMR content for communication via an LMR network using an LMR transport module of said LMR communication module, and
        communicating said LMR content from an LMR transmitter of said LMR communication module to said LMR base station via said LMR network using an LMR network transport protocol; and
    if said cellular data network communication module is selected, then
        generating, by said common LMR application module, said LMR content formatted in accordance with said LMR application layer protocol format,
        encapsulating, by an LMR encapsulation module of said cellular data network communication module, the LMR content using an Internet Protocol (IP) packet switched header in accordance with an IP layer, said encapsulating exclusive of any LMR transport layer between an LMR application layer protocol and said IP layer;
        communicating the LMR content from a cellular radio module of said cellular data network communication module to said LMR base station via a cellular data network using at least one cellular network transport protocol and without conversion of the LMR content from said LMR application layer protocol format to a cellular application layer protocol format.

2. A method in accordance with claim 1, further comprising establishing a communication link between the LMR radio unit and the cellular data network using a cellular data network communication setup routine.

3. A method in accordance with claim 1, wherein one of a plurality of cellular band frequencies is used instead of an LMR frequency band for communicating the LMR content over said cellular data network.

4. A method in accordance with claim 1, further comprising determining an operating condition of the LMR radio unit and communicating the LMR content via one of the cellular data network and said LMR network based on the determined operating condition.

5. A method in accordance with claim 4, wherein the operating condition comprises one of a current signal strength and a current geographic location of the LMR radio unit.

6. A method for providing land mobile radio (LMR) services using a cellular data network, the method comprising:
   generating in a common LMR application module, LMR content formatted in accordance with an LMR application layer protocol format;
   communicating said LMR content over an LMR network using an LMR communication module including said common LMR application module and an LMR transport module;
   if said LMR content is to be communicated over a cellular data network, encapsulating said LMR content in an LMR encapsulation module using a packet switching protocol including an Internet Protocol (IP) layer, without conversion of said LMR content to a cellular application layer format, said encapsulating exclusive of any LMR transport layer between an LMR application layer protocol and said IP layer;
   communicating said encapsulated LMR content in accordance with a cellular network transport protocol over a cellular data network using a cellular data network communication module including said common LMR application module, said LMR encapsulation module, and a cellular radio modem;
   selectively coupling one of said LMR communication module and said cellular data network communication module to an input/output module including transmission and receiving components configured for selectively communicating said LMR content to and from an LMR network and a cellular data network.

7. The method according to claim 6, further comprising encapsulating said LMR content exclusive of any intermediate presentation or session protocol layer between an LMR application layer and said IP layer.

8. The method according to claim 6, further comprising automatically selecting one of the LMR communication module and cellular data network module for communication of said LMR content based on at least one of an operating condition, a user setting, a predetermined setting and a type of LMR communication.

9. A method for providing land mobile radio (LMR) services using a cellular data network, the method comprising:
   selecting, by an LMR radio unit, one of an LMR communication module and a cellular data network communication module for facilitating communication of LMR content therefrom to an LMR base station;
   generating LMR content formatted in accordance with an LMR application layer protocol format using a common LMR application module included within said LMR communication module and said cellular data network communication module;
   if said LMR content is to be communicated over an LMR network, then
      providing said LMR content from said common LMR application module to an LMR transport module of said LMR communication module, and
      transmitting said LMR content to said LMR network using an input/output module of said LMR radio unit;
   if said LMR content is to be communicated over a cellular data network, then
      communicating said LMR content from said common LMR application module to an LMR encapsulation module of said cellular data network communication module,
      encapsulating the LMR content by said LMR encapsulation module using an Internet Protocol (IP) packet switched header in accordance with an IP layer, said encapsulating exclusive of any LMR transport layer between an LMR application layer protocol and said IP layer,
      communicating the LMR content over said cellular data network using said input/output module and at least one cellular network transport protocol, without conversion of the LMR content from said LMR application layer protocol format to a cellular application layer protocol format, and
      communicating said LMR content from said cellular data network to said LMR base station over a packet switched LMR infrastructure using said IP packet switched header.

10. The method according to claim 9, further comprising performing said encapsulating exclusive of any intermediate presentation or session protocol layer between an LMR application layer protocol and said IP layer.

* * * * *